United States Patent
Bays-Muchmore

(10) Patent No.: US 10,858,089 B2
(45) Date of Patent: Dec. 8, 2020

(54) STALL RECOVERY CHINE SPOILER SYSTEM

(71) Applicant: The Boeing Company, Chicago, IL (US)

(72) Inventor: C. Byram Bays-Muchmore, Bellevue, WA (US)

(73) Assignee: The Boeing Company, Chicago, IL (US)

(*) Notice: Subject to any disclaimer, the term of this patent is extended or adjusted under 35 U.S.C. 154(b) by 523 days.

(21) Appl. No.: 15/483,304

(22) Filed: Apr. 10, 2017

(65) Prior Publication Data

US 2018/0290727 A1 Oct. 11, 2018

(51) Int. Cl.
| | |
|---|---|
| *B64C 3/10* | (2006.01) |
| *B64C 5/12* | (2006.01) |
| *B64C 9/36* | (2006.01) |
| *B64C 23/06* | (2006.01) |
| *B64D 29/02* | (2006.01) |
| *B64C 7/02* | (2006.01) |

(52) U.S. Cl.
CPC ............ *B64C 9/36* (2013.01); *B64C 3/10* (2013.01); *B64C 5/12* (2013.01); *B64C 7/02* (2013.01); *B64C 23/06* (2013.01); *B64D 29/02* (2013.01)

(58) Field of Classification Search
CPC .... B64C 9/36; B64C 3/10; B64C 5/12; B64C 23/06; B64D 29/02
See application file for complete search history.

(56) References Cited

U.S. PATENT DOCUMENTS

| | | | | |
|---|---|---|---|---|
| 4,540,143 | A * | 9/1985 | Wang | B64C 7/02 244/130 |
| 5,326,050 | A * | 7/1994 | Zell | B64C 5/12 244/99.1 |
| 8,087,617 | B2 | 1/2012 | Sclafani et al. | |
| 2005/0011993 | A1* | 1/2005 | Konings | B64C 7/02 244/198 |
| 2009/0289149 | A1* | 11/2009 | Schwetzler | B64C 7/02 244/199.1 |
| 2010/0176249 | A1* | 7/2010 | Schwetzler | B64C 7/02 244/199.1 |
| 2016/0243806 | A1* | 8/2016 | Frost | B64C 5/06 |

\* cited by examiner

*Primary Examiner* — Rodney A Bonnette
(74) *Attorney, Agent, or Firm* — Miller, Matthias & Hull LLP

(57) ABSTRACT

A chine spoiler system enhances aircraft wing stall recovery characteristics while optimizing a maximum lift coefficient (CLMAX) of an aft-swept wing on an aircraft having an engine nacelle mounted below the wing. The system includes a chine located on a surface of the nacelle; the chine is configured to generate a vortex at high angles of attack. The vortex passes over an upper surface of the wing, favorably influencing inboard wing aerodynamics to delay airflow separation from the wing, in advance of a stall. The vortex increases CLMAX, but also creates a nose-up pitching moment on an aft-swept wing, which degrades stall recovery. A chine spoiler system module is configured to render the chine ineffective at predetermined wing flap configurations and angles of attack (typically post CLMAX) to balance the objectives of achieving high pre-stall CLMAX, while providing a nose-down pitching moment increment for improved stall recovery.

20 Claims, 6 Drawing Sheets

STALL RECOVERY CHINE SPOILER SYSTEM

FIELD

The present disclosure relates generally to aircraft flight controls for managing aerodynamic wing lift characteristics, and more specifically to engine nacelle chine systems for achieving improved stall performance while maintaining pitch control at high angles of attack.

BACKGROUND

Aerodynamic landing configurations of swept-wing transport aircraft are often a compromise between two competing objectives: 1) minimizing aircraft stall speed, and 2) maintaining an acceptable nose-down pitching moment capability at high angles of attack. Aircraft certification requirements specify both minimum landing speed safety margins relative to aircraft stall speed, and sufficient nose-down pitch control at high angles of attack to ensure safe recovery from wing stalls. A given certified stall speed is based upon a particular maximum lift coefficient (CLMAX) that the aircraft can achieve. Higher CLMAX values correspond to lower stall speeds, which are directly translatable into slower landing speeds. Slower landing speeds, in turn, permit shorter runway operations and/or greater payload capabilities. For aft-swept wings, a design change that causes an inboard wing, the most forward portion of the wing, to generate more lift near CLMAX may, however, result in greater nose-up pitching moment, rather than the required nose-down pitching moment. A greater nose-up pitching moment will degrade stall recovery capability, and thus works against a design that balances performance efficiencies with required stall recovery capability.

For aft-swept wings on transport aircraft having their engines mounted below the wing, a nacelle chine is often used as design feature to increase CLMAX. Each chine is attached to an engine nacelle, and generates a vortex that favorably influences inboard wing aerodynamics to delay air flow separation from an upper surface of the wing, which occurs at the onset of a wing stall. The chine results in an increased CLMAX, but produces an undesirable incremental nose-up pitching moment. The nose-up pitching moment can become a constraint that in some cases prevents implementing other design features that would generate even greater CLMAX values, such as use of larger nacelle chines or more effective inboard leading edge high lift devices. Thus, there is a need in the art for inventions that provide additional nose-down pitching moment control, particularly at post-CLMAX or "post-stall" angles of attack, without compromising "pre-stall" CLMAX performance.

SUMMARY

In accordance with one form of the present disclosure, a chine spoiler system manages airflow over an aircraft wing that includes an engine nacelle suspended below the wing. The system includes a chine mounted to an inboard surface of the nacelle; the chine is configured to generate a vortex that passes over an inboard upper surface of the wing. The vortex influences inboard wing aerodynamics in a manner to increase maximum coefficient of lift of the wing. The system includes a chine spoiler control module for disabling effectiveness of the chine during recovery from an aerodynamic stall of the wing.

In accordance with another form of the present disclosure, an aircraft having an aft-swept wing, including an engine nacelle suspended below the wing, includes a chine spoiler system for managing airflow over the aircraft wing. The chine spoiler system includes a chine positioned on an inboard surface of the aircraft engine nacelle, and a chine spoiler control module configured to selectively enable and disable the chine as a function of angle of attack of the wing, and to disable the chine immediately following a stall of the wing.

In accordance with yet another form of the present disclosure, a method of making a chine spoiler system to enable and disable a chine to selectively control aerodynamic airflow over an upper surface of an aft-swept aircraft wing having an engine nacelle suspended below the wing includes steps of providing a chine on an inboard surface of an aircraft engine nacelle. The method further includes configuring a chine spoiler control module to have signal inputs of aircraft wing flap configuration and angle of attack, and configuring the chine spoiler control module to disable the chine upon a wing stall.

The features, functions, and advantages disclosed herein can be achieved independently in various embodiments or may be combined in yet other embodiments, the details of which may be better appreciated with reference to the following description and drawings.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the present disclosure. Actual scope of the disclosure is as defined in the appended claims.

Figure 1:
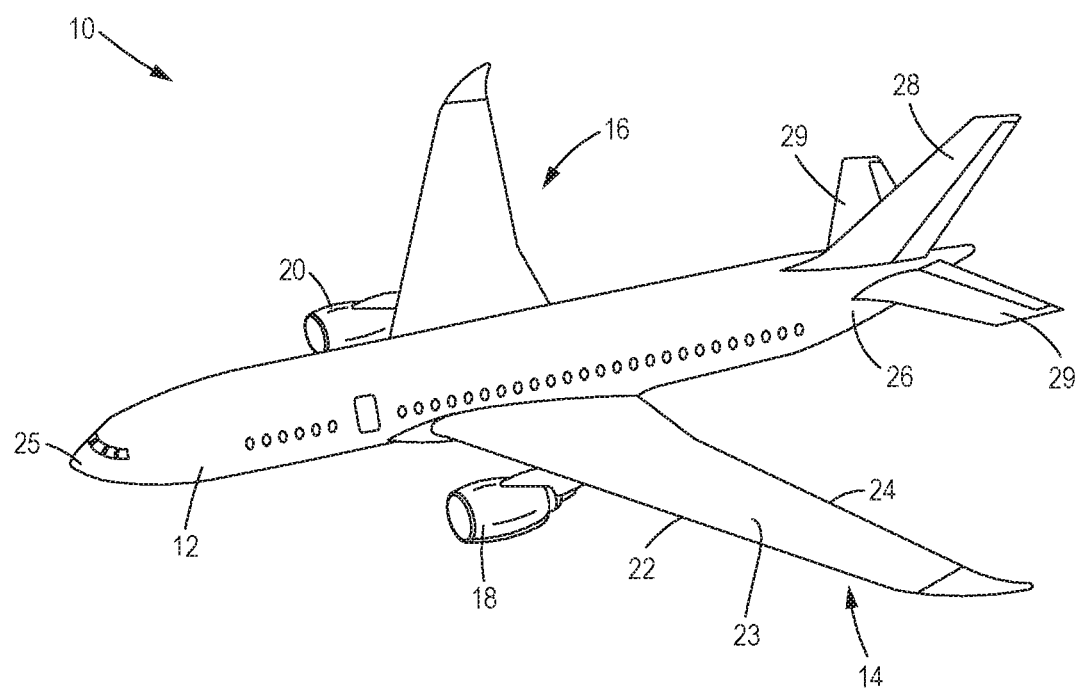
FIG. 1 is a perspective in-flight view of an aft-swept wing transport aircraft that includes a chine spoiler system, configured in accordance with the present disclosure.

Referring initially to FIG. 1, a commercial transport aircraft 10 is shown in flight. The aircraft 10 includes a main body or fuselage 12, and a pair of wings including a left wing 14 and a right wing 16, each wing extending laterally, or outwardly of the fuselage 12, in a so-called aft-swept direction typical of jet aircraft. Each wing 14, 16, includes a left engine 18 and a right engine 20, respectively, as shown mounted below each of the left and right wings 14, 16, respectively. Each wing has a leading edge 22, an upper surface 23, and a trailing edge 24, each of those elements being shown only with respect to the left wing 14 in FIG. 1. The aircraft 10 further includes a nose 25, and a tail or empennage 26 that includes a vertical stabilizer 28 and left and right horizontal stabilizers 29.

Figure 2:
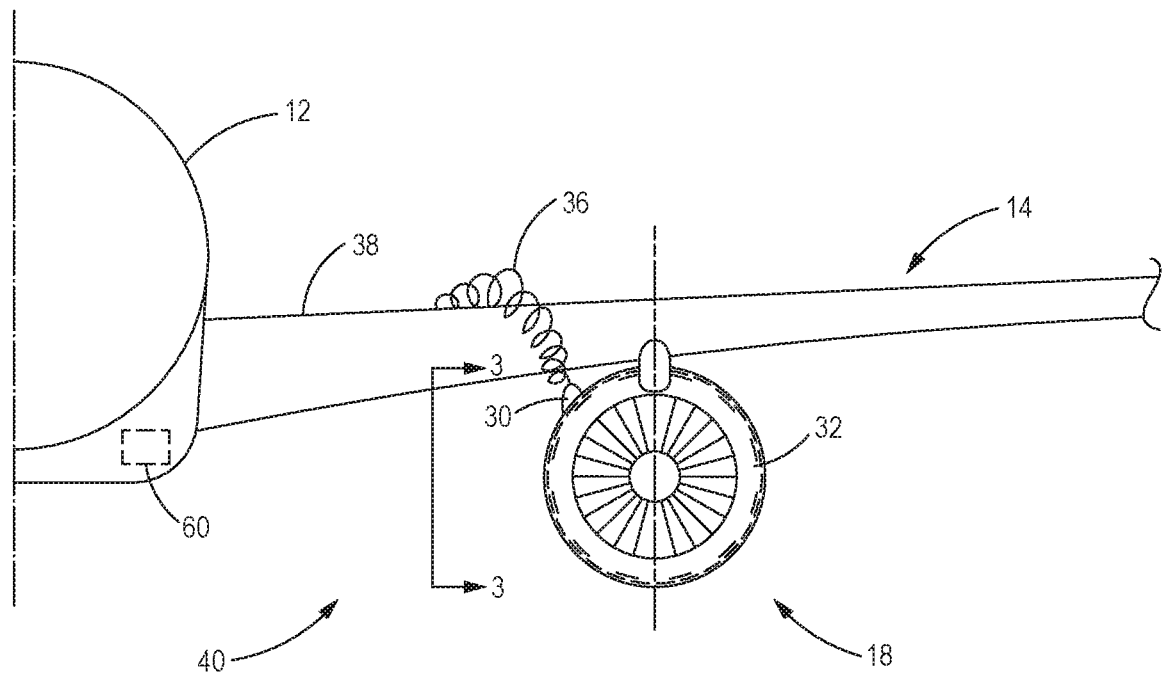
FIG. 2 is a left half frontal view of the aircraft of FIG. 1.

Referring now to FIG. 2, a chine 30, situated on an inboard side of an engine nacelle 32, is shown in an enabled, or deployed, state. The chine is configured to generate a vortex 36 that passes over the upper surface 23 (FIG. 1) of an inboard portion 38 of the left wing 14, as shown. Although a corresponding chine is similarly situated on the engine 20 of the right wing 16, only the left-wing chine is shown and described herein, for the sake of brevity.

The vortex 36 generated by the chine 30 is designed to favorably influence aerodynamics of the inboard wing portion 38. The vortex 36, configured to pass over the wing 14, intensifies as the angle of attack of the wing 14 increases. As the wing approaches a maximum lift coefficient (CLMAX), which occurs just prior to an aerodynamic stall of the wing, the vortex acts to delay airflow separation from the upper wing surface 23. This effectively delays a stall by increasing the CLMAX of the wing. However, once a stall occurs, it is desirable that the effect of the chine be disabled to enhance stall recovery characteristics.

As will be explained herein, the chine 30 may be selectively disabled by a chine spoiler system 40 that, in addition to the chine 30, includes a chine spoiler control module 60 situated onboard the aircraft 10, as also shown in FIG. 2. The chine spoiler control module 60 is configured to enable and disable the chine in accordance with signal inputs of aircraft wing flap configuration and angle of attack, as further described herein.

Figure 3A:
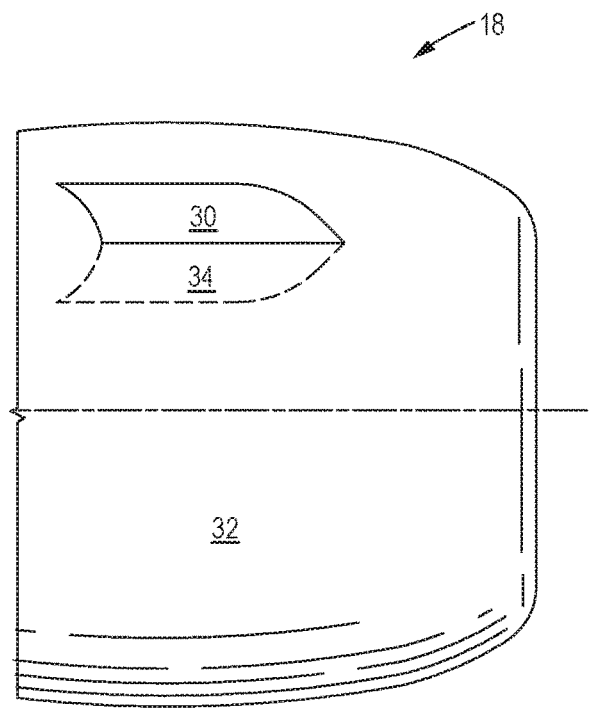
FIG. 3A is a perspective view of one element of one embodiment of the chine spoiler system, viewed along lines 3-3 of FIG. 2.

Referring now to FIG. 3A, an inboard side of the nacelle 32 depicts the chine 30, fully enabled or deployed. The chine 30 is retractable, which provides for its disablement. It is controlled by the chine spoiler control module 60 configured to physically move the chine, i.e. to enable and disable the chine, in accordance with pre-installed program logic, discussed below. For its disablement, the chine is retracted into a recess 34 of the nacelle 32, in which it may become flush with the nacelle 32 for aerodynamic efficiency. Alternative embodiments, for example those that may include some retrofit implementations, may not include the recess 34. In such arrangements, the chine 30 would merely lie flush against the nacelle 32.

Figure 3B:
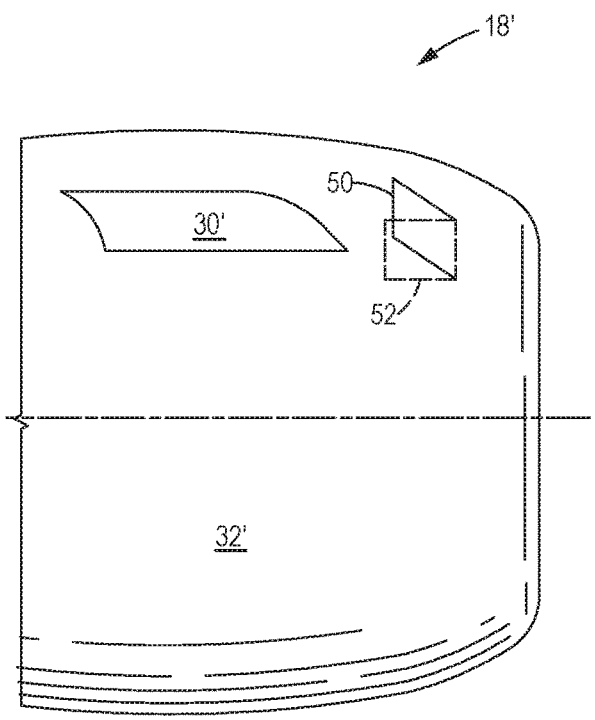
FIG. 3B is a perspective view of elements of a second embodiment of the chine spoiler system, viewed along lines 3-3 of FIG. 2.

Referring now to FIG. 3B, an alternate embodiment of the chine 30' is fixed to a nacelle 32' of a left engine 18'. As such, the chine 30' is non-retractable. In FIG. 3B, the fixed chine 30' is shown disabled by a chine spoiler door 50, which is retractable, and is configured to pivot downwardly and into a recess 52 of the nacelle 32'. Similar to the chine 30, however, the retractable chine spoiler door 50 may alternatively be designed to operate without the recess 52, as perhaps for some retrofit implementations that may require the chine spoiler door 50 to lie flush against the nacelle whenever the chine is enabled.

In the disclosed embodiment, the chine spoiler door is depicted as being positioned forwardly, and orthogonally oriented with respect to, the chine 30'. Alternative embodiments may permit the chine spoiler door to have other positional relationships and orientations sufficient to influence airflow over the chine. For example, the chine spoiler door could be angled with respect to orientation of the fixed chine 30' and/or be situated to either side of the chine, if and as determined to be aerodynamically effective to disable the chine 30'.

As will be appreciated by those skilled in the art, it is envisioned that the chine spoiler control module 60 of the chine spoiler door embodiment may also be similarly programmed relative to wing flap configuration and angle of attack to selectively influence aerodynamic airflow over the chine 30'.

Figure 4:
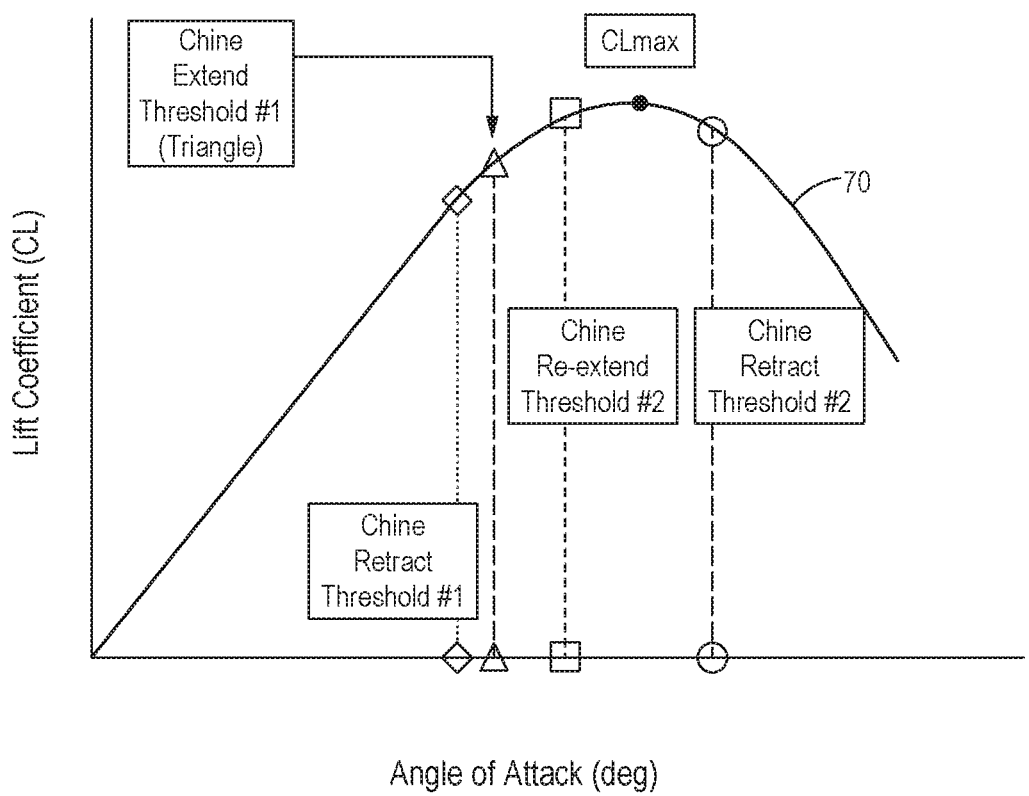
FIG. 4 is a graph depicting wing lift coefficient as a function of angle of attack, in accordance with one embodiment of the present disclosure.

Referring now to FIG. 4, an exemplary curve 70 depicts a plot of lift coefficient as generated by the wing 14 against an angle of attack of the wing 14. The curve 70 has a zenith (CLMAX) that represents a maximum lift coefficient of the wing 14. Those skilled in the art will appreciate that upon an aerodynamic stall, the wing 14 will have just reached its maximum lift at the top of the curve 70. Thus, in the portion of the curve 70 beyond CLMAX, the wing will be stalled. Ascending the curve toward CLMAX, the chine spoiler control module 60 will be configured to command extension of the chine at an angle of attack indicated as Chine Extend Threshold #1 on the graph. Conversely, in a post-stall condition, i.e., at an angle of attack above that for achieving CLMAX, the chine spoiler control module 60 will command disablement, i.e. retraction of the chine 30, as for example shown at Chine Retract Threshold #2.

As configured, the chine spoiler system 40 may operate as a function of both wing flap configuration and angle of attack, but, for purposes of this disclosure, at least as a function of angle of attack. As angle of attack of the wing 14 is reduced during a stall recovery, the chine 30 will be re-extended by the chine spoiler system 40 at an angle of attack indicated as Chine Re-extend Threshold #2, and will remain extended until the angle of attack is reduced below an angle of attack indicated as Chine Retract Threshold #1. Of course, at lower angles of attack, such as during typical flight routines including cruise, the chine spoiler module 60 will keep the chine 30 retracted.

Figure 4A:
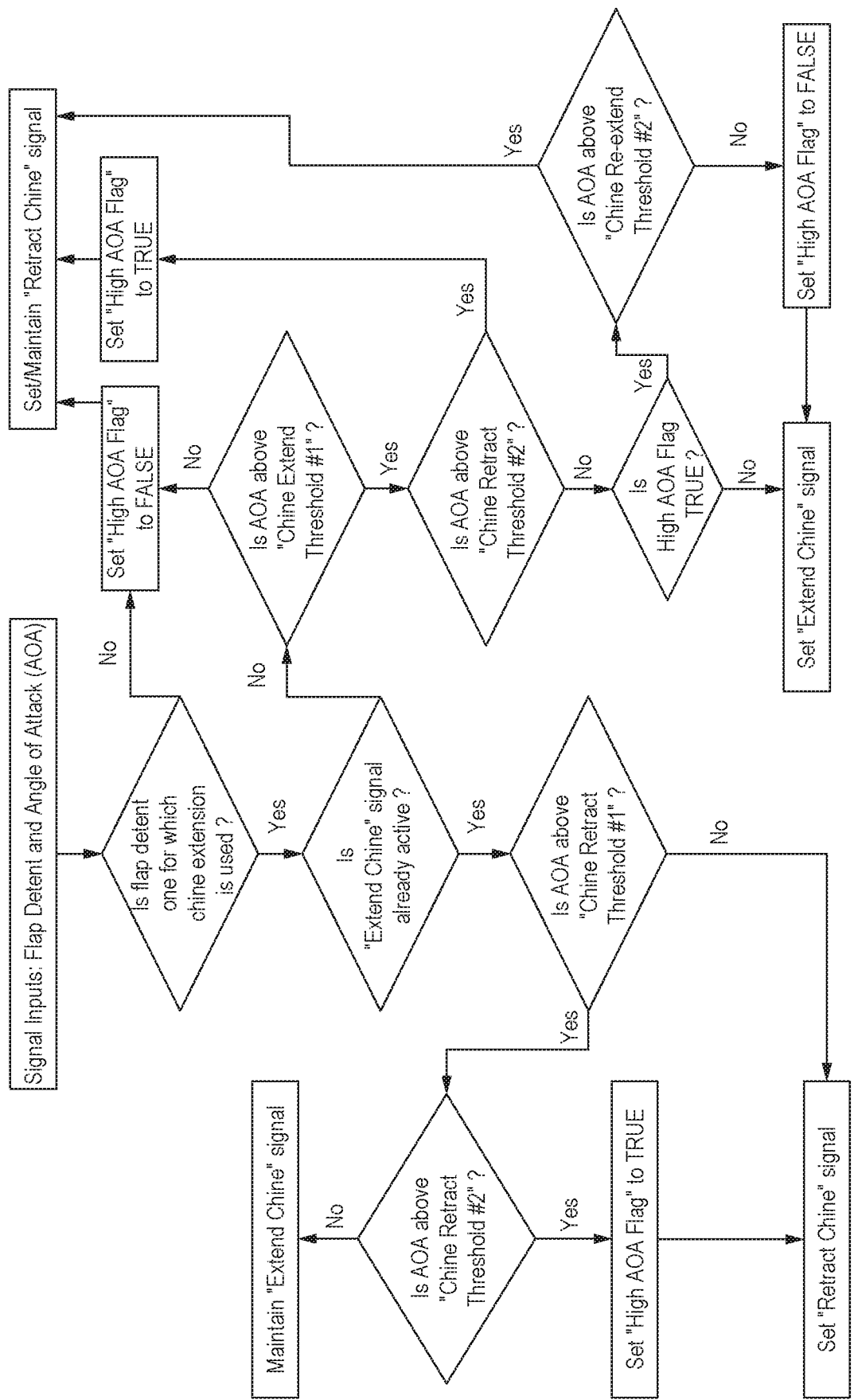
FIG. 4A is a flowchart related to the graph of FIG. 4.

Referring now to FIG. 4A, a flowchart depicts an exemplary example of a logic program that may be executed by the chine spoiler control module 60. The underlying assumption is that, at low angles of attack, the baseline position of the chine 30 is the retracted or disabled position, whether or not wing flaps are deployed. Therefore, the chine 30 (FIG. 3A) will generally be stowed or retracted during low angles of attack, such as during typical flight routines. However, at high angles of attack, such as those achieved during slower flight and/or at elevated loads incurred during in-flight turn maneuvers, the chine 30 may selectively be enabled, i.e. deployed, to assure greater CLMAX values for retention of an acceptable stall speed of the wing 14. Accordingly, within the flowchart of FIG. 4A, the logic program will specify whether to "Extend Chine" or "Retract Chine", as shown. A "High AOA" (meaning high angle of attack) flag used in the program will be initialized to read "FALSE" at the initiation of each flight.

Figure 5:
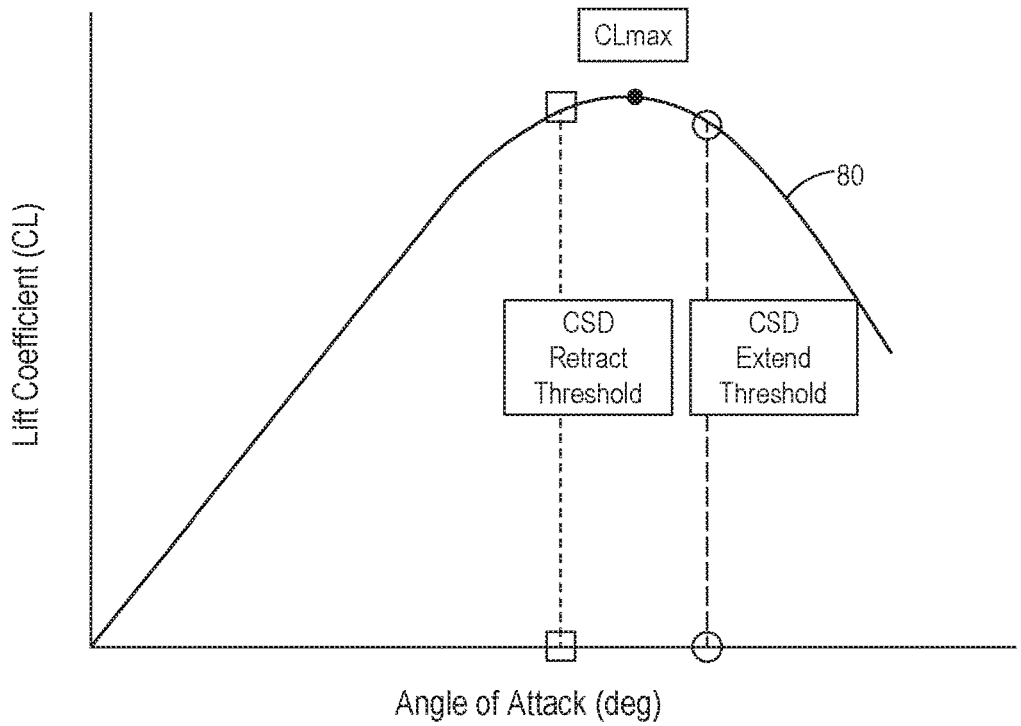
FIG. 5 is a graph depicting wing lift coefficient as a function of angle of attack, in accordance with another embodiment of the disclosure.
Figure 5A:
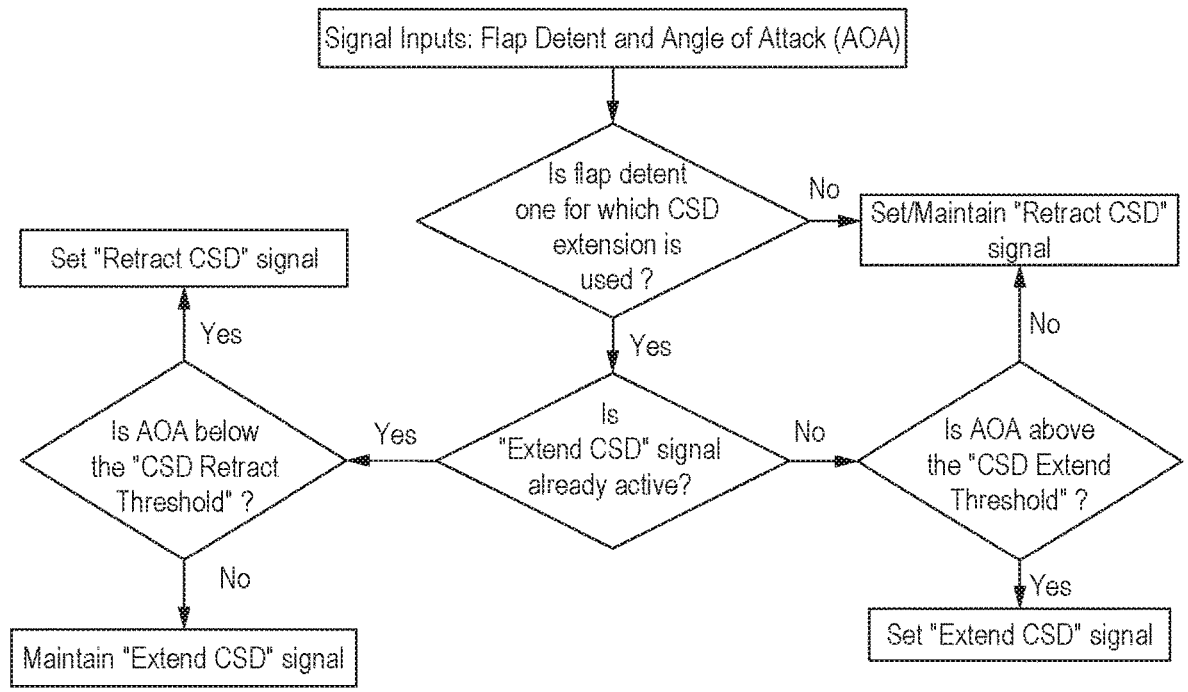
FIG. 5A is a flowchart related to the graph of FIG. 5.

Referring now to FIG. 5, a second graph displays a curve 80, similar to the curve 70 of FIG. 4, but based on use of a chine spoiler door 30', as the alternate chine disabling medium, described above. A flowchart reflecting a logic program for the events depicted in curve 80 is provided in FIG. 5A. It will be appreciated that, for each of the described chine systems, the chine spoiler control module 60 may be configured to disable the chine at an angle of attack selected to optimize both CLMAX and post-stall pitch characteristics.

Finally, a method of making a chine spoiler system for an aircraft, to enable and disable a chine to selectively control aerodynamic airflow over an upper surface of an aft-swept aircraft wing having an engine nacelle suspended below the wing, may include steps of providing a chine on an inboard surface of an aircraft engine nacelle, and installing a chine spoiler control module in the aircraft to have signal inputs of aircraft wing flap configuration and angle of attack. Further steps may include configuring the chine spoiler control module to disable the chine upon a wing stall event.

Additional steps may include configuring the chine spoiler control module to maintain the chine in a normally disabled position at low angles of attack, including a cruise phase of flight, and configuring the chine spoiler control module to enable and disable the chine as a function of angle of attack. Further steps may include configuring the chine to be retractable on the inboard surface of the nacelle, and configuring the chine spoiler control module to disable the chine at a predetermined angle of attack threshold by retracting the chine.

An alternate method may include steps of fixing the chine to the nacelle, affixing a deployable chine spoiler door on the nacelle forwardly of the chine, and orienting the chine spoiler door to deploy to a position that influences airflow over the chine, and disabling the chine by deploying the chine spoiler door.

Numerous iterations of logic programs may be installed into the chine spoiler control module 60. For example, the active enabling and disabling of the chine may only be required for some flap configurations. In various other flap configurations, the chine may remain enabled or disabled at all angles of attack.

The disclosed embodiments and features may have additional variations and alternative constructions neither described nor suggested herein. For example, choice of whether to utilize a retractable chine or whether to implement a chine spoiler door to disable a chine may be dependent on constraints of particular engine nacelle designs, and/or may be different for new, as opposed to retrofit, implementations. Similarly, whether the nacelle chine or spoiler door retracts into a recess of the nacelle or retracts directly against the nacelle will depend upon particular constraints for a given aircraft. Moreover, specific retrofit arrangements may call for different chine enablement and disablement points in the curves 70 and 80 for optimization of stall recovery characteristics, as may be appreciated by those skilled in the art.

In addition, the chine spoiler control module 60 may be a separate system on an airplane, and/or its functions may be integrated into other systems that perform other functions. Moreover, although the module 60 has been described as configured to retract a chine immediately following or during a stall of an aircraft wing, this disclosure is broad enough to cover the disablement of a chine at the onset of a stall, or even within the CLMAX threshold portions of curves 70 and 80, for example. Finally, although the disclosure presents structures in specific shapes and sizes depicted, numerous variations of structures displayed herein may be envisioned for use in alternative embodiments, as may be appreciated by those skilled in the art.

What is claimed is:

1. A system for managing airflow over an aircraft wing including an engine nacelle suspended below the aircraft wing, the system comprising:
 a chine mounted to an inboard surface of the engine nacelle, the chine configured to generate a vortex that passes over an inboard upper surface of the aircraft wing;
 a chine spoiler system configured to selectively disable the chine, and
 a chine spoiler control module operably coupled to the chine spoiler system and programmed to:
  send a non-transitory signal to the chine spoiler system to disable the chine when a determined angle of attack of the aircraft wing is above a maximum lift angle of attack of the aircraft wing corresponding to a maximum coefficient of lift of the aircraft wing; and
  send a non-transitory signal to the chine spoiler system to optimize post-stall pitch characteristics for improved stall recovery.

2. The system of claim 1, wherein the chine spoiler control module is programmed to send the non-transitory signal to the chine spoiler system to disable the chine immediately when the determined angle of attack is above the maximum lift angle of attack.

3. The system of claim 1, wherein the chine spoiler control module is programmed to send the non-transitory signal to the chine spoiler system to disable the chine immediately upon a wing stall event.

4. The system of claim 1, wherein the aircraft wing is an aft-swept wing.

5. A system for managing airflow over an aircraft wing including an engine nacelle suspended below the aircraft wing, the system comprising:
 a fixed chine mounted to an inboard surface of the engine nacelle, the fixed chine configured to generate a vortex that passes over an inboard upper surface of the aircraft wing to influence inboard wing aerodynamics in a manner to increase maximum coefficient of lift of the aircraft wing;
 a chine spoiler system comprising a retractable chine spoiler device; and
 a chine spoiler control module operably coupled to the chine spoiler system and programmed to send a non-transitory signal to the chine spoiler system to deploy the retractable chine spoiler device during an aerodynamic stall recovery of the aircraft wing.

6. The system of claim 5, wherein the retractable chine spoiler device comprises a chine spoiler door.

7. The system of claim 6, wherein the chine spoiler door is mounted on the engine nacelle proximal to the fixed chine to selectively influence airflow over the fixed chine.

8. The system of claim 7, wherein the chine spoiler control module is further programmed to send a non-transitory signal to the chine spoiler system to extend the chine spoiler door immediately following a stall.

9. An aircraft having an aft-swept wing including an engine nacelle suspended below the aft-swept wing, the aircraft comprising:
 a chine spoiler system for managing airflow over the aircraft wing, the chine spoiler system including a chine positioned on an inboard surface of the engine nacelle; and
 a chine spoiler control module operably coupled to the chine spoiler system, the chine spoiler control module programmed to:
  send a non-transitory signal to the chine spoiler system to disable the chine when a determined angle of attack of the aft-swept wing is above a maximum lift angle of attack of the aft-swept wing corresponding to a maximum coefficient of lift of the aft-swept wing; and send a non-transitory signal to the chine spoiler system to optimize post-stall pitch characteristics for improved stall recovery.

10. The aircraft of claim 9, wherein the chine spoiler control module is programmed to send the non-transitory signal to the chine spoiler system to disable the chine immediately when the determined angle of attack is above the maximum lift angle of attack.

11. The aircraft of claim 10, wherein the chine spoiler control module is programmed to send the non-transitory signal to the chine spoiler system to disable the chine immediately upon a wing stall event.

12. An aircraft having an aft-swept wing including an engine nacelle suspended below the aft-swept wing, the aircraft comprising:
   a chine spoiler system for managing airflow over the aircraft wing, the chine spoiler system including:
      a fixed chine positioned on an inboard surface of the engine nacelle; and
      a retractable chine spoiler door positioned on the engine nacelle, wherein the retractable chine spoiler door is configured to enable or disable the fixed chine; and
   a chine spoiler control module operably coupled to the chine spoiler system and programmed to send non-transitory signals to the chine spoiler system to selectively enable and disable the fixed chine as a function of angle of attack of the aft-swept wing, and to disable the fixed chine immediately following a stall of the aft-swept wing.

13. The aircraft of claim 12, wherein the engine nacelle has a recess, and wherein the retractable chine spoiler door fits within the recess when the fixed chine is enabled.

14. The aircraft of claim 13, wherein the retractable chine spoiler door has a deployed position for disabling the fixed chine; and wherein the retractable chine spoiler door extends out of the recess when in the deployed position.

15. The aircraft of claim 12, wherein the retractable chine spoiler door is mounted on the engine nacelle proximal to the fixed chine to selectively influence airflow over the fixed chine when the retractable chine spoiler door is in a deployed position.

16. A method of making a system for an aircraft to enable and disable a chine to selectively control aerodynamic airflow over an upper surface of an aft-swept aircraft wing having an engine nacelle suspended below the aft-swept aircraft wing; the method comprising steps of:
   providing a chine on an inboard surface of an aircraft engine nacelle;
   providing a chine spoiler system configured to enable and disable the chine;
   installing a chine spoiler control module in the aircraft and operatively coupled to the chine spoiler system, the chine spoiler control module receiving signal inputs of aircraft wing flap configuration and angle of attack and being programmed to send a non-transitory signal to the chine spoiler system to disable the chine upon a wing stall event.

17. The method of claim 16, in which the chine spoiler control module is further programmed to:
   send a non-transitory signal to the chine spoiler system to maintain the chine in a normally disabled position at low angles of attack, including cruise phases of flight; and
   send non-transitory signals to the chine spoiler system to enable and disable the chine as a function of angle of attack.

18. The method of claim 16, further comprising configuring the chine to be retractable on the inboard surface of the engine nacelle;
   wherein the chine spoiler control module is programmed to send a non-transitory signal to the chine spoiler system to disable the chine by retracting the chine.

19. The method of claim 16, further comprising the step of fixing the chine to the engine nacelle, affixing a deployable chine spoiler door on the engine nacelle, and positioning the deployable chine spoiler door proximally with respect to the chine to influence airflow over the chine.

20. The method of claim 19, in which the chine spoiler control module is programmed to send a non-transitory signal to the chine spoiler system to disable the chine by deploying the deployable chine spoiler door.

* * * * *